United States Patent [19]

Chang

[11] Patent Number: 5,145,089
[45] Date of Patent: Sep. 8, 1992

[54] STRUCTURE OF PAN COVER

[76] Inventor: Kwei T. Chang, No. 14, Lane 54, Luong Chuan St., Panchiao, Taipei Hsien, Taiwan

[21] Appl. No.: 735,234

[22] Filed: Jul. 24, 1991

[51] Int. Cl.⁵ ............................................. B65D 51/16
[52] U.S. Cl. ................................... 220/371; 220/369; 220/370; 220/912; 220/DIG. 27; 220/729; 220/731
[58] Field of Search ............... 220/371, 372, 370, 369, 220/912, DIG. 27, 212, 254, 255, 729, 731, 747, 745, 748

[56] References Cited

U.S. PATENT DOCUMENTS

| | | | |
|---|---|---|---|
| 2,510,196 | 6/1950 | Willette | 220/369 |
| 2,609,960 | 9/1952 | Irwin | 220/369 |
| 2,702,143 | 2/1955 | Williamson | 220/369 |
| 3,857,381 | 12/1974 | Kato | 220/369 X |
| 4,000,830 | 1/1977 | French | 220/369 |
| 4,137,333 | 1/1979 | Daswick | 220/DIG. 27 X |
| 4,700,689 | 10/1987 | Speker | 220/369 X |

*Primary Examiner*—Stephen Marcus
*Assistant Examiner*—Paul A. Schwarz
*Attorney, Agent, or Firm*—Lowe, Price, LeBlanc & Becker

[57] ABSTRACT

A pan cover for covering a cooking pan, comprising a cover plate retained in between a top member and a bottom member, wherein a plurality of parallel slots are respectively made on said top and bottom members and aligned with each other, and a smoke absorber is retained between said top and bottom member to absorb smoke coming below. The cover plate is made from transparent, reinforced fiber glass the inside can be clearly seen.

1 Claim, 3 Drawing Sheets

STRUCTURE OF PAN COVER

BACKGROUND OF THE INVENTION

The present invention relates to pan covers and relates more particularly to an improved structure of pan cover for covering a cooking pan, which has means to absorb smoke and sight glass means for viewing the inside.

Conventionally, a pan cover is simply made of an opaque material in shape suitable for covering a cooking pan. During cooking, the cover of a cooking pan must be moved from place so that one can check the food in said cooking pan. When the cover of a cooking pan is removed from place, the smoke in said cooking pan may rush out to irritate one's eyes. When a big amount of smoke comes out of a cooking pan at a time, it may escape from the suction force of a smoke exhauster to pollute the air.

SUMMARY OF THE INVENTION

The present invention has been accomplished to eliminate the aforesaid problems. It is therefore an object of the present invention to provide a pan cover for covering a cooking pan, which has means to absorb the smoke caused in the cooking pan during cooking. It is another object of the present invention to provide a pan cover for covering a cooking pan, which has sight glass means for viewing the inside of the cooking pan during cooking.

DETAILED DESCRIPTION OF THE PREFERRED EMBODIMENTS

Figure 1:
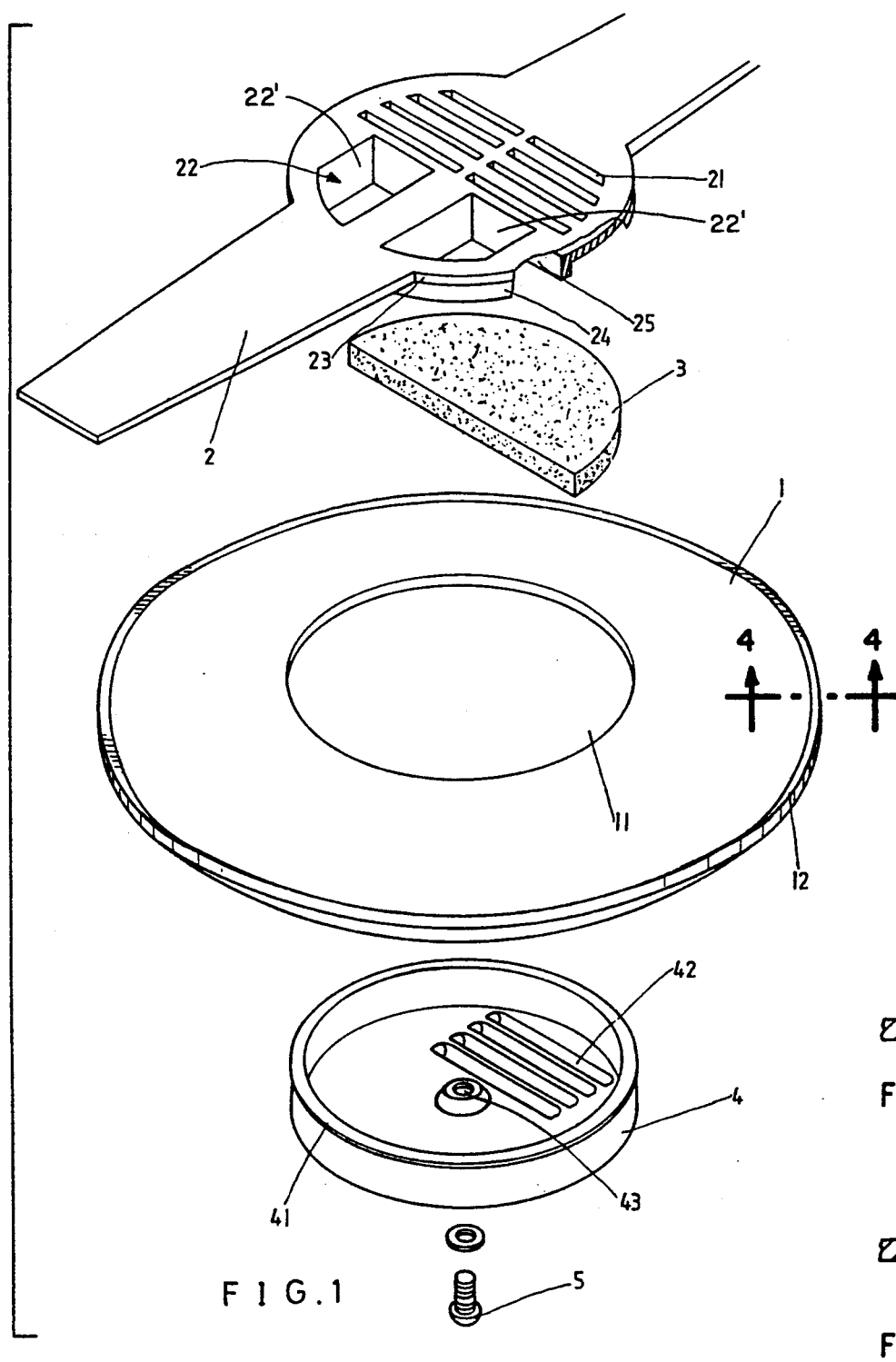
FIG. 1 is a dismantled perspective view of the preferred embodiment of the pan cover of the present invention.
Figure 4:
FIG. 4 is a cross sectional view taken along lines 4—4 of FIG. 1.
Figure 4A:
FIG. 4A is a cross sectional view of an alternative embodiment taken along lines 4—4 of FIG. 1.

Referring to FIG. 1, a pan cover in accordance with the present invention is generally comprised of a cover plate 1, a top member 2, a smoke absorber 3, and a bottom member 4. The cover plate 1 is made of transparent, reinforced fiber glass having a hole 11 formed at the center and a trim 12 fastened around the periphery thereof. The top member 2 is made in a substantially elongated structure, having a circular portion with a peripheral flange 23 bilaterally extending outwards at the middle, a plurality of parallel slots 21 defined on one half thereof and a hand-hold 22 of finger grip depressing 22' defined on the opposite half portion 23, a circular projection 24 vertically extending downwards from said flange 23 and defining with a segment wall 25 a receiving chamber for holding the smoke absorber 3, and a bolt hole (not shown) for receiving bolt 5 at the bottom. The bottom member 4 has a top flange 41 projecting outwards from the topmost edge thereof, a plurality of parallel slots 42 corresponding to the parallel slots 21 on the top member 2, and a fastening hole 43 at the center for receiving bolt 5.

After the smoke absorber 3 is fastened in the receiving chamber 25 inside the circular projection 24 of the top member 2, the top member 2 is attached to the cover plate 1 by inserting the circular projection 24 thereof in the hole 11 on the cover plate 1, then, the bottom member 4 is attached to the bottom edge of the cover plate 1 to hold the circular projection 24 of the top member 2 permitting the cover plate 1 to be firmly retained between the circular projection 24 and the top flange 41, and then, fasten a screw 5 in the fastening hole 43 and the bolt hole 26 to fixedly secure the top and bottom members 2 and 4 to the cover plate 1.

Figure 2:
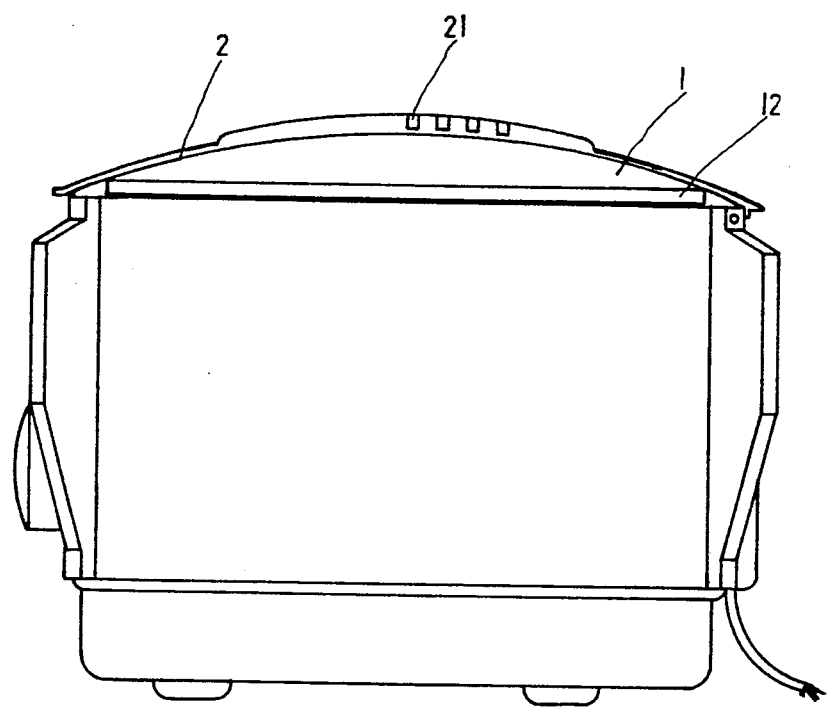
FIG. 2 illustrates a cooking pan which is covered with a pan cover constructed according to the present invention.
Figure 3:
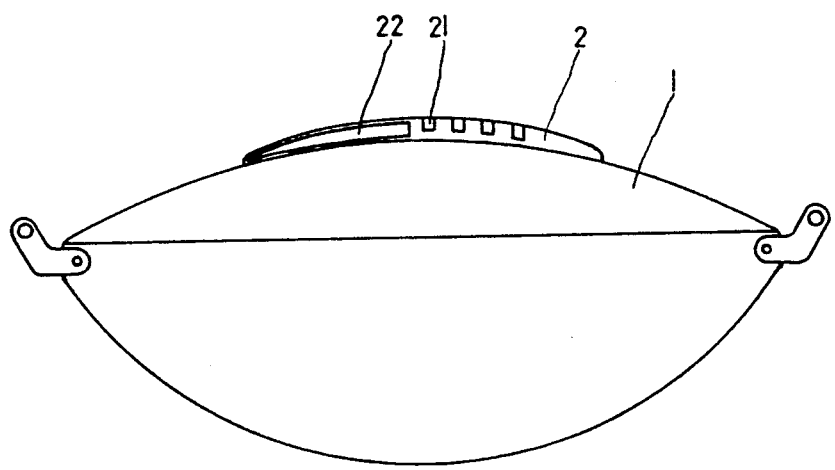
FIG. 3 illustrates a wok which is covered with a pan cover constructed according to the present invention.

After assembly, the smoke absorber 3 is disposed between the parallel slots 21 on the top member 2 and the parallel slots 42 on the bottom member 4 absorb smoke coming below. Because the cover plate 1 is made of transparent, reinforced fiber glass, one can clearly see the inside through the cover plate 1. Further, the trim 12 on the periphery of the cover plate 1 may be made either in a G-shape suitable for covering a cooking pan or pot as shown in FIG. 2, or in a C-shape suitable for covering a wok as shown in FIG. 3.

What is claimed is:

1. A cover for a cooking pan, comprising:

a cover plate made of transparent, reinforced fiber glass, having a hole through the center thereof and defining an integral trim extending around the periphery thereof;

an elongated top member having a central circular portion with a flange extending outwardly therefrom, said portion defining a plurality of parallel slots on one side and a hand-hold finger grip on the opposite side, said portion defining also a circular projection vertically extending downwardly from said circular portion and defining therein the upper portion of a receiving chamber beneath said parallel slots, said projection dimensioned to fit within the center hole of said cover plate;

smoke absorber means disposed in said receiving chamber for filtering smoke passing through said chamber;

a cup-shaped, circular bottom member having an upper flange projecting outwardly from the upper edge thereof, and defining a plurality of parallel slots on one side of the lower portion thereof corresponding to the parallel slots on said top member, and a fastening means at the center thereof for securing said bottom member in said top member to form the receiving chamber with smoke absorber means therebetween; and wherein said circular portion of said top member is inserted in said center hole on said cover plate from the top and said bottom member is attached to said top member with the upper flange of said bottom member receiving the circular projection of said top member with said cover plate retained between said top and bottom members by said fastening so that the receiving chamber formed between said top and bottom members with said absorber means therein has parallel slots in the top and bottom thereof.

* * * * *